US010447805B2

(12) United States Patent
Mosko

(10) Patent No.: US 10,447,805 B2
(45) Date of Patent: Oct. 15, 2019

(54) DISTRIBUTED CONSENSUS IN A CONTENT CENTRIC NETWORK

(71) Applicant: CISCO TECHNOLOGY, INC., San Jose, CA (US)

(72) Inventor: Marc E. Mosko, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 336 days.

(21) Appl. No.: 15/289,739

(22) Filed: Oct. 10, 2016

(65) Prior Publication Data
US 2018/0103117 A1 Apr. 12, 2018

(51) Int. Cl.
H04L 29/08 (2006.01)

(52) U.S. Cl.
CPC .............. H04L 67/32 (2013.01); H04L 67/10 (2013.01); H04L 67/327 (2013.01)

(58) Field of Classification Search
CPC ........ H04L 67/10; H04L 67/32; H04L 67/327
USPC ........................................................ 709/201
See application file for complete search history.

(56) References Cited

U.S. PATENT DOCUMENTS

| 817,441 | A | 4/1906 | Niesz |
| 4,309,569 | A | 1/1982 | Merkle |
| 4,921,898 | A | 5/1990 | Lenney |
| 5,070,134 | A | 12/1991 | Oyamada |
| 5,110,856 | A | 5/1992 | Oyamada |
| 5,214,702 | A | 5/1993 | Fischer |
| 5,377,354 | A | 12/1994 | Scannell |
| 5,506,844 | A | 4/1996 | Rao |
| 5,629,370 | A | 5/1997 | Freidzon |
| 5,845,207 | A | 12/1998 | Amin |
| 5,870,605 | A | 2/1999 | Bracho |
| 6,047,331 | A | 4/2000 | Medard |
| 6,052,683 | A | 4/2000 | Irwin |
| 6,085,320 | A | 7/2000 | Kaliski, Jr. |
| 6,091,724 | A | 7/2000 | Chandra |

(Continued)

FOREIGN PATENT DOCUMENTS

| CN | 103873371 | 6/2014 |
| DE | 1720277 A1 | 6/1967 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

Primary Examiner — June Y Sison
Assistant Examiner — Adam A Cooney

(57) ABSTRACT

One embodiment provides a system that facilitates distributed consensus in a content centric network. During operation, the system generates, by a coordinator for a plurality of nodes, a first interest that indicates a request to approve a proposed value for a variable. In response to receiving a positive acknowledgment of the first interest from a majority of the nodes, the coordinator generates a second interest that indicates a request to accept the proposed value. A name for the first interest and a name for the second interest include an identifier of the variable and a round number. A payload of the first interest and a payload of the second interest include the proposed value. In response to receiving a positive acknowledgement of the second interest from the majority of the nodes, the system generates a notification indicating that an agreed-upon value for the variable is the proposed value.

20 Claims, 8 Drawing Sheets

(56) References Cited

U.S. PATENT DOCUMENTS

| | | |
|---|---|---|
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 9,363,086 B2 * | 6/2016 | Uzun .................. H04L 9/3236 |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |

(56) References Cited

U.S. PATENT DOCUMENTS

| | | |
|---|---|---|
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0198359 A1* | 9/2005 | Basani ............... H04L 67/1095 709/232 |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |

(56) References Cited

U.S. PATENT DOCUMENTS

| | | |
|---|---|---|
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0159472 A1* | 6/2013 | Newton .............. H04L 67/2852 709/219 |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |

(56) References Cited

U.S. PATENT DOCUMENTS

| | | |
|---|---|---|
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1* | 9/2014 | Solis .............. H04L 67/327 709/204 |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |
| 2017/0201577 A1* | 7/2017 | Wood .............. H04L 67/1095 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2434729 A2 | 3/2012 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2015084327 | 6/2015 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Jacobson, Van et al. 'VoCCN: Voice Over Content-Centric Networks.' Dec. 1, 2009. ACM ReArch'09.

(56) References Cited

OTHER PUBLICATIONS

Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
"PBC Library-Pairing-Based Cryptography-About," http://crypto.stanford.edu/pbc. downloaded Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, a novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
Anteniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.

(56) References Cited

OTHER PUBLICATIONS

Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Science vol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

(56) References Cited

OTHER PUBLICATIONS

S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

(56) References Cited

OTHER PUBLICATIONS

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* *figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* *Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
International Search Report and Written Opinion in counterpart International Application No. PCT/US2017/043836, dated Oct. 2, 2017.
Dang, et al., "Paxos Made Switch-y", ACM SIGCOMM Computer Communication Review, https://github.com/usi-systems/p4paxos, vol. 46, No. 2, Apr. 2016, 7 pgs.

\* cited by examiner

DISTRIBUTED CONSENSUS IN A CONTENT CENTRIC NETWORK

RELATED APPLICATION

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. patent application Ser. No. 14/231,515, entitled "AGGREGATE SIGNING OF DATA IN CONTENT CENTRIC NETWORKING," by inventors Ersin Uzun, Marc E. Mosko, Michael F. Plass, and Glenn C. Scott, filed 31 Mar. 2014 (hereinafter "U.S. patent application Ser. No. 14/231,515");

the disclosures of which are herein incorporated by reference in their entirety.

BACKGROUND

Field

This disclosure is generally related to distribution of digital content. More specifically, this disclosure is related to a system for facilitating distributed consensus in a content centric network based on a Paxos algorithm.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content-object packets in return. CCN interests and content objects are identified by their unique names, which are typically hierarchically structured variable length identifiers (HSVLI). An HSVLI can include contiguous name components ordered from a most general level to a most specific level.

Distributed consensus is crucial in today's network to provide fast, reliable, and lively services. Paxos is a family of protocols for solving consensus in a network of unreliable processors. In distributed consensus, the process of agreeing on one result among a group of participants presents challenges when the participants or their communication medium may experience failures. Paxos protocols typically involve three types of entities: proposers; acceptors; and learners. In Basic Paxos, a proposer sends a "prepare" request with a counter "N" and a value "V" to at least a majority of acceptors. Upon receiving the prepare request, an acceptor can respond with an ACK that N is the current maximum, and can also include any previously accepted value for V. When the proposer has received ACKs from the majority of the acceptors, the proposer sends an "accept" request for (N, V) (i.e., the consensus value) to the acceptors. Upon receiving the accept request, an acceptor can both respond with an ACK and notify the learner of the consensus value. The learner can inform other interested systems (including the involved proposer and acceptors) of the consensus value.

A CCN is a distributed system where consensus among nodes is an important feature (e.g., agreeing on a single value that is the outcome of an election or an environmental observation). Consensus is necessary, for example, if multiple writers wish to agree on the current version number of a CCNx name or if multiple distributed systems wish to elect a leader for fast transaction processing. Though CCN brings many desirable features to a network, some issues remain unsolved for achieving distributed consensus.

SUMMARY

One embodiment provides a system that facilitates distributed consensus in a content centric network. During operation, the system generates, by a coordinator for a plurality of nodes, a first interest that indicates a request to approve a proposed value for a variable. In response to receiving a positive acknowledgment of the first interest from a majority of the nodes, the coordinator generates a second interest that indicates a request to accept the proposed value. A name for the first interest and a name for the second interest include an identifier of the variable and a round number. A payload of the first interest and a payload of the second interest include the proposed value. In response to receiving a positive acknowledgement of the second interest from the majority of the nodes, the system generates a notification indicating that an agreed-upon value for the variable is the proposed value.

In some embodiments, in response to receiving a third interest indicating a request to read the agreed-upon value for the variable, wherein a name for the third interest includes the variable identifier and the round number, the system generates, by the coordinator, a content object which indicates the round number and one or more of: the agreed-upon value for the variable; an iteration number corresponding to the round number; a negative acknowledgment if the agreed-upon value for the variable is indeterminate; and a no-operation indicator if no agreed-upon value for the variable exists.

In some embodiments, the positive acknowledgement of the second interest is transmitted to the coordinator by the majority of the nodes. The notification is generated by the majority of the nodes and further transmitted to a learning device, which transmits the notification as a fourth interest to one or more systems interested in the agreed-upon value for the variable.

In some embodiments, the name for the first interest, the name for the second interest, the name for the third interest, and the name for the fourth interest further include one or more of: a routable prefix for one of the majority of the nodes; an identifier for a consensus group to which the one of the majority of the nodes belongs, wherein the plurality of nodes belong to the consensus group; an indicator of a logical program associated with the variable identifier; and an iteration number corresponding to the round number.

In some embodiments, the name for the first interest indicates the request to approve the proposed value for the variable, the name for the second interest indicates the request to accept the proposed value, the name for the third interest indicates the request to read the agreed-upon value, and the name for the fourth interest indicates the notification to allow a receiving device to learn the agreed-upon value.

In some embodiments, the system transmits, by the coordinator, the first interest to a multicast group comprised of the majority of the nodes. The coordinator transmits the second interest to the multicast group. The name for the first interest and the name for the second interest further include one or more of: an identifier for a consensus group to which the one of the majority of the nodes belongs, wherein the plurality of nodes belong to the consensus group, wherein the consensus group identifier is the most general level name component; and an indicator of a group version to which the majority of the nodes belongs. The payload of the first interest further includes a routable prefix of the coordinator to be used by a node in response to the first interest, and the payload of the second interest further includes a routable prefix of a target to be used by a node in response to the second interest.

In some embodiments, the proposed value is one or more of: a link to a piece of content which describes a current state of an algorithm; a link to a manifest, which is a content object indicating a collection of other content objects; and the manifest embedded in the proposed value.

In some embodiments, a response by one of the majority of the nodes to an interest is a content object with a same name as the name for the interest, and the content object has a lifetime set to a small or a zero value.

One embodiment provides a system that facilitates distributed consensus in a content centric network. During operation, the system receives, from a coordinator for a plurality of nodes by a node, a first interest indicating a request to approve a proposed value for a variable. In response to agreeing with the proposed value, the node transmits a positive acknowledgement of the first interest to the coordinator. The node receives a second interest indicating a request to accept the proposed value. A name for the first interest and a name for the second interest include an identifier of the variable and a round number, and a payload of the first interest and a payload of the second interest include the proposed value. In response to accepting the proposed value, the node transmits a positive acknowledgement of the second interest to the coordinator.

In some embodiments, in response to accepting the proposed value, the node transmits a notification indicating that an agreed-upon value for the variable is the proposed value to a learning device, which transmits the notification as a third interest to one or more systems interested in the agreed-upon value for the variable.

In some embodiments, in response to not agreeing with the proposed value, the node transmits a negative acknowledgment of the first interest to the coordinator. The negative acknowledgment includes a previous value for the variable corresponding to a previous round number.

BRIEF DESCRIPTION OF THE FIGURES

In the figures, like reference numerals refer to the same figure elements.

DETAILED DESCRIPTION

Figure 1:
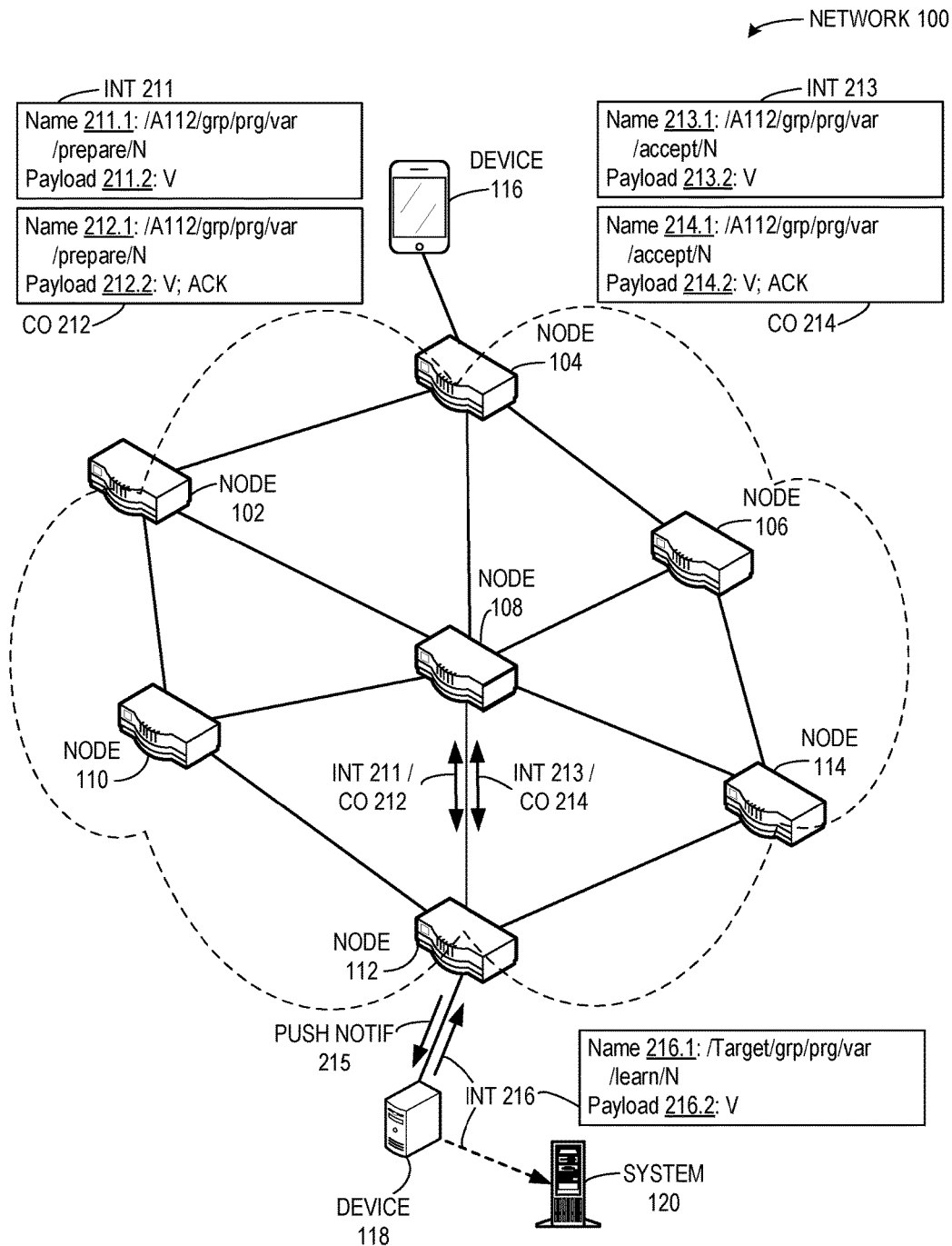
FIG. 1 illustrates an exemplary network facilitating distributed consensus in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which facilitates distributed consensus in a CCN based on the Paxos algorithm. Distributed consensus is crucial in today's network to provide fast, reliable, and lively services. Paxos is a family of protocols for solving consensus in a network of unreliable processors. In distributed consensus, the process of agreeing on one result among a group of participants presents challenges when the participants or their communication medium may experience failures. Paxos protocols typically involve three types of entities: proposers; acceptors; and learners. In Basic Paxos, a proposer sends a "prepare" request with a counter N and a value V to at least a majority of acceptors. Upon receiving the prepare request, an acceptor can respond with an acknowledgment (ACK) that N is the current maximum, and can also include any previously accepted value for V. When the proposer has received ACKs from the majority of the acceptors, the proposer sends an "accept" request for (N, V) (i.e., the consensus value) to the acceptors. Upon receiving the accept request, an acceptor can both respond with an ACK, and notify the learner of the consensus value. The learner can then inform other interested systems (including the involved proposer and acceptors) of the consensus value.

In Multi-Paxos, which is based on a series of iterations of Basic Paxos, a consensus value V can evolve over time, as $\{V_0, \ldots, V_i\}$. A single master proposer may be selected using Basic Paxos, and after the master proposer has succeeded in Phase 1 (e.g., round $N_0$ corresponding to $V_0$), the master proposer can submit as many values as it wishes in subsequent phases, by submitting pairs $\{i, V_i\}$. The distinction between the three types of entities in Paxos (proposer, acceptor, and learner) is not exclusive. That is, each entity can be a potential proposer, acceptor, or learner. Each entity can contend for the proposer role and all entities can act as an acceptor or a learner.

A CCN is a distributed system where consensus among nodes is an important feature (e.g., agreeing on a single value that is the outcome of an election or an environmental observation). Consensus is necessary, for example, if multiple writers wish to agree on the current version number of a CCN name or if multiple distributed systems wish to elect a leader for fast transaction processing. Embodiments of the present invention provide a system that facilitates distributed consensus in a CCN based on the Paxos algorithm. One form is based on the standard CCN exchange of an interest (i.e., request) and a content object (i.e., response), as described below in relation to FIGS. 1, 2, 3A-3C. Another form is based on an exchange of a Push request and a response, as described below in relation to FIG. 4.

Thus, the present system provides improvements to the distribution of digital content, where the improvements are fundamentally technological. Embodiments of the present invention provide a technological solution (e.g., determining distributed consensus on values for system-related variables based on the Paxos algorithm using interest/content object exchanges and/or push request/response exchanges) to the technological problem of efficiently achieving consensus in a distributed system such as a CCN.

The following terms describe elements of a CCN architecture:

Content Object or "content object": A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. The HSVLI can comprise contiguous name components ordered from a most general level to a most specific level.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814, which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest or "interest": A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175, which is hereby incorporated by reference. In addition, CCNx 1.0 is a specific protocol suite and implementation of CCN.

Distributed Consensus in a CCN: Interest and Content Object Exchanges

In a system which facilitates distributed consensus in a CCN based on the Paxos algorithm, three types of entities can exist: a proposer; an acceptor; and a learner. A plurality or group of nodes can participate in a consensus decision on a value for a variable, and a majority of the participating nodes must agree on the value for the variable in order for the consensus value to be accepted. Any node in the group may be chosen to act as the proposer or coordinator in a round related to the consensus decision. Assume that a current proposer (or "master" or "master proposer") of a consensus group is elected using distributed consensus where each contending proposer bids to have its value accepted. The accepted consensus value determines the master proposer. The actual value can be the name of the CCNx content object that describes the proposer. The set of acceptors can be maintained as a consensus value. A new system may enter as an acceptor or be removed, if non-responsive, by the proposer, which can perform such an action based on a protected variable. This allows the proposer to know what constitutes a majority. The identity of the learner is also maintained as a protected value. The acceptors have knowledge of the identity of the current learner, and can inform the learner of the acceptors' accept choices. The learner can use the identities of the acceptor group associated with the given consensus value and notify all acceptors and proposers. The learner can also notify other systems interested in the given consensus value.

As described above, one form of achieving distributed consensus is based on the standard CCN exchange of an interest (i.e., request) and a content object (i.e., response). Below are four exemplary formats for names of interest (and corresponding responsive content objects):

| | |
|---|---|
| /proposer/grp/prg/var/read/[N[/iter]] | Format (1) |
| /acceptor/grp/prg/var/prepare/N[/iter] | Format (2) |
| /acceptor/grp/prg/var/accept/N[/iter] | Format (3) |
| /target/grp/prg/var/learn/N[/iter] | Format (4) |

The name components "/proposer," "/acceptor," and "/target" identify, respectively, a proposer, an acceptor, and a target (such as a learner, a proposer, an acceptor, or other system). The identifier can be a routable prefix for the respective entity. The substring of name components "/grp/prg/var" identifies, respectively, the consensus group grp in which the acceptor participates, the logical program prg, and the protected variable var. The name components "/read," "/prepare," "/accept," and "/learn" identify the type of request. The suffix "/N/[iter]" identifies, respectively, the ordering N (which can identify the round number) and the optional iteration iter. When using CCNx 1.0 labeled names, the suffix can take the form of, e.g., "App:prepare=N" and "App:iter=iter."

The payload of the request carries the state of the request. Specifically, the payload carries the value V. The value can be a CCNx 1.0 link to a piece of content which describes a current state of an algorithm. The value can also be a link to a manifest, which is a content object indicating a collection of other content objects, or can be the actual manifest embedded in the value. Manifests, or secure content catalogs, are described in U.S. patent application Ser. No. 14/231,515.

Any system may read the current consensus value by sending an interest of Format (1) ("read request"). In response, the proposer returns the current consensus value, which is the tuple (N, iter, $V_{iter}$). A requesting system may also specify a specific N or (N, iter) pair. If the proposer does not know the consensus value for a read request, the proposer can respond with a NACK if the consensus value is indeterminate, or the proposer can respond with a no-operation indicator if no consensus value exists to satisfy the read request.

A proposer can send an interest of Format (2) ("prepare request") to a majority of acceptors. Upon receiving the prepare request, an acceptor can return an ACK content object response to the proposer. The acceptor can also return nothing or a NACK content object response to the proposer, and the NACK content object response can include the acceptor's most recent consensus value and round for the variable.

When the proposer has collected sufficient ACKS (e.g., received an ACK from a majority of the acceptors), the proposer can send an interest of Format (3) ("accept request") to a majority of acceptors. Upon receiving the accept request, an acceptor can return an ACK content object response to the proposer. In addition, the acceptor can send a push request (or notification or interest of Format (4)) to the learner, which indicates the ACK of the accept request for the given variable for the given round and/or iteration. When the learner has collected sufficient ACKs (e.g., received an ACK from a majority of the acceptors), the learner can send an interest of Format (4) ("learn request") to one or more targets. The targets can include the proposer and the acceptors, as well as other systems or devices not involved in the consensus group.

Note that an acceptor's content object response (to the prepare request and to the accept request) follows the reverse path of the request back to the proposer. The content object response carries in its payload the consensus value or state for the current round or iteration. To avoid excessive caching by a node, the content object response can have a lifetime (e.g., MaxAge) set to a small or a zero value.

Distributed Consensus in a CCN: Interest Multicast

Another form of achieving distributed consensus in a CCN is based on multicasting an interest. A proposer can transmit a single Push request message to an interest multicast group, and all listening acceptors can receive the single Push request message. Because the proposer requires knowledge of when it has received a majority of responses (e.g., collected a sufficient number of ACKs), the group of acceptors listening to the group name is identified by a specific group version with a known number of acceptors. The payload of the Push message sent by the proposer can include an identifier for the proposer, which allows each acceptor to send an individual Push response message directly back to the proposer. Thus, the Push responses do not necessarily follow the reverse path of the corresponding Push request.

This multicast method uses similar signaling as the previously described method based on interest and content object exchanges. One difference in the multicast method is that the routable prefix is now the group name "grp" rather than the individual acceptor:

| | |
|---|---|
| /grp/grpver/prg/var/prepare/N[/iter] | Format (5) |
| /grp/grpver/prg/var/accept/N[/iter] | Format (6) |
| /grp/grpver/prg/var/learn/N[/iter] | Format (7) |

The name component "grpver" identifies the version corresponding to the group grp. Another difference in the multicast method is that in some embodiments, the payload of a request carries the target name to use in the response. However, including the target name in the payload of an individual Push request message is not strictly necessary because all systems have knowledge of the current system state as well as the identity of the proposer and the learner from the consensus state and the group version grpver. This is because the proposer is the response target for a prepare or accept request and the learner is the ACK destination for a learn request.

In the multicast method, a proposer can send a first Push interest message (e.g., a prepare request or message which is an interest of Format (5)) to the interest multicast group grp, which allows all listening acceptors to receive the interest and respond directly to the proposer with a first Push response, based on a name or identifier for the proposer as carried in the payload of the Push interest message. When the proposer has collected sufficient positive responses, the proposer can send a second Push interest message (e.g., an accept request or message which is an interest of Format (6)) to the interest multicast group grp, and all listening acceptors can receive the second Push interest message and respond directly to the proposer or a learner with a second Push response, again based on the identifier as carried in the payload of the second Push interest message.

In addition, in the "learning" stage, the learner may use a mixture of interest and content object exchanges and of multicast Push learn messages of Format (7). A node can respond to a Push learn message with a Push acknowledgment message. In the above example, the identifier carried in the payload of the second Push interest message can be an identifier for a learner that is an entity distinct from the proposer. As such, the listening acceptors that receive the second Push interest message will send a response directly to the learner. Upon collecting sufficient second Push responses, the learner can send a third Push interest message (e.g., a learn message which is an interest of Format (7)) to the interest multicast group, and all listening acceptors can respond directly to the learner with a third Push response, which is an ACK of the learn message. The learner can also send a similar third Push interest message to any other interested systems, and can receive a responsive Push ACK from the other systems.

In some embodiments, the proposer can act as the learner, and the identifier carried in the payload of the second Push interest message can be the proposer identifier. Upon collecting sufficient second Push responses, the proposer can send the third Push interest message (e.g., a learn message which is an interest of Format (7)), and all listening acceptors can again respond directly to the proposer with a third Push response, which is an ACK of the learn message.

Exemplary Network and Communication

FIG. 1 illustrates an exemplary network 100 facilitating distributed consensus in a content centric network, in accordance with an embodiment of the present invention. Network 100 can include a consumer or content-consuming device 116, a producer or content-producing device 118, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106-110).

Node 108 can be a proposer ("P108"); nodes 104, 106, 110, 112, and 114 can be acceptors comprising a plurality of nodes involved in a consensus group ("A104," "A106," "A110," "A112", and "A114"); and device 118 can be a learner ("L118"). That is, these five nodes (A104, A106, A110, A112, and A114) are acceptors in a distributed consensus protocol. The majority of these five nodes is thus three nodes (where the majority is more than half of five).

During operation, P108 sends a first interest (i.e., a prepare request) to a majority of the acceptors, e.g., to three acceptors such as A110, A112, and A114. For example, P108 can send to A112 an interest 211 with a name 211.1 of "/A112/grp/prg/var/prepare/N" and a payload 211.2 with a value of "V." Name 211.1 can also include an iteration number (not shown). Upon receiving interest 211, A112 can determine to agree with the prepare request by sending a responsive ACK content object 212 with a name 212.1 of "/A112/grp/prg/var/prepare/N" and a payload 212.2 with a value of "V; ACK." The acknowledgment can be included or indicated in content object 212 in other ways.

When P108 has received ACKs from the majority (e.g., the three nodes A110, A112, and A114), P108 sends a second interest (i.e., an accept request) to the majority of the acceptors (e.g., A110, A112, and A114). For example, P108 can send to A112 an interest 213 with a name 213.1 of "/A112/grp/prg/var/accept/N" and a payload 213.2 with a value of "V." Upon receiving interest 213, A112 can determine to agree with the accept request by sending a responsive ACK content object 214 with a name 214.1 of "/A112/grp/prg/var/accept/N" and a payload 214.2 with a value of "V; ACK." A112 can also send an interest or push notification 215 to learner 118 ("L118").

L118 can respond to A112 with a responsive content object ACK or a push response (not shown). When L118 has received push notifications from the majority (e.g., collected sufficient ACKs), L118 can also generate and transmit another interest (i.e., a learn request) to one or more targets, which can include P108, any of acceptors A102, A104, A106, A110, A112, and A114 (including acceptors both involved and not involved in the consensus decision as well as other nodes that are not acceptors), and one or more other targets. For example, L118 can send to system 120 an interest 216 with a name 216.1 of "/Target/grp/prg/var/learn/N" and a payload 216.2 with a value of "V," where "/Target" identifies system 120. Upon receiving interest 216, system 120 can send a responsive ACK content object (not shown). As another example, L118 can send to A112 an interest 216 with a name 216.1 of "/Target/grp/prg/var/learn/N" and a payload 216.2 with a value of "V," where "/Target" identifies A112. Upon receiving interest 216, A112 can send a responsive ACK content object (not shown).

Thus, the system facilitates distributed consensus in a CCN based on the Paxos algorithm by mapping Paxos communications to interest and content object exchanges. The other embodiment (multicasting interests), is described below in relation to FIG. 4.

Detailed Description of Exemplary Communication

Figure 2:
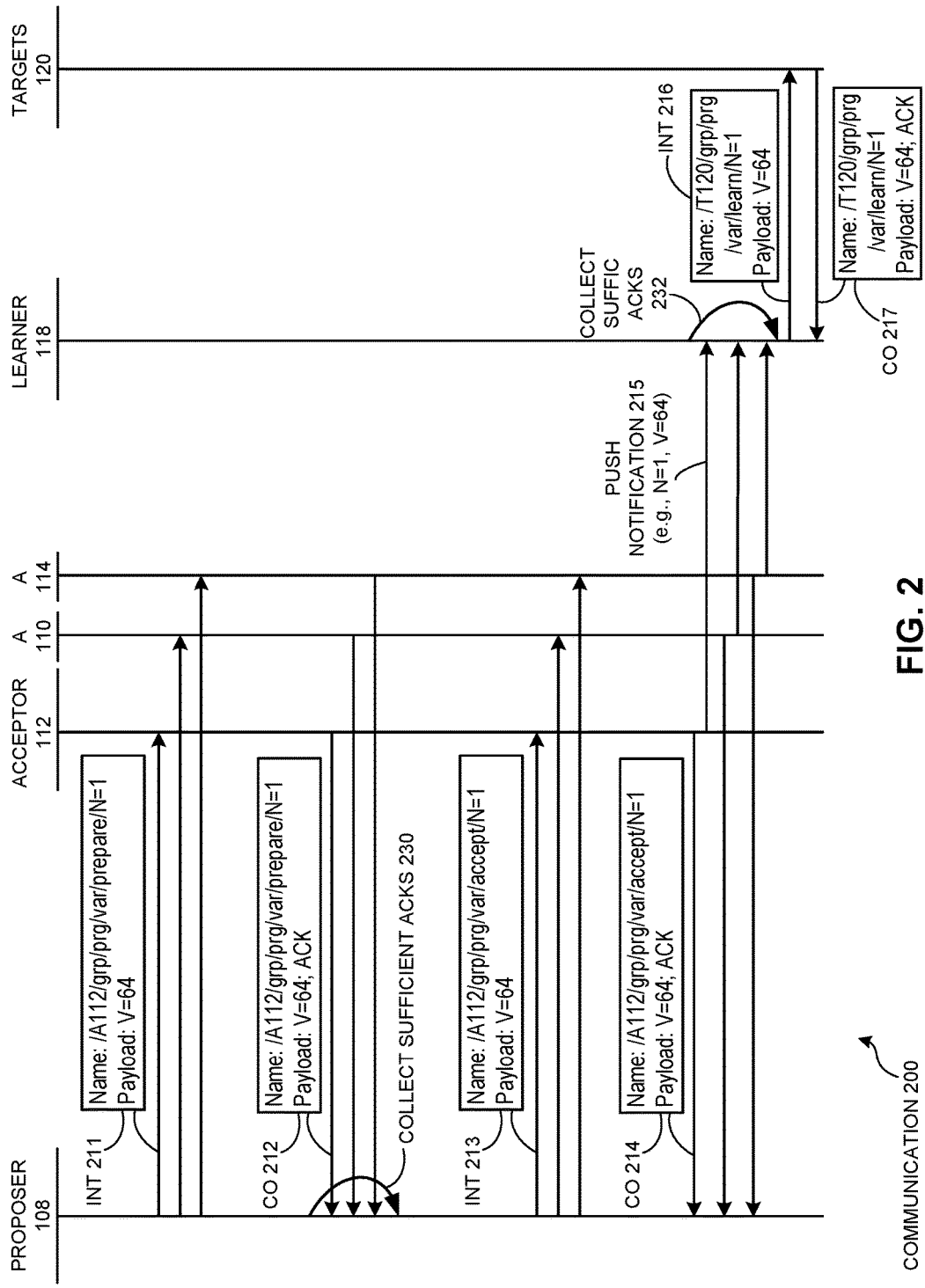
FIG. 2 presents exemplary communication between a proposer, acceptors, a learner, and targets, in accordance with an embodiment of the present invention.

FIG. 2 presents exemplary communication 200 between a proposer 108 (P108), acceptors 110, 112, and 114 (A110, 112, and A114), a learner 118 (L118), and targets 120 (T120), in accordance with an embodiment of the present invention. Communication 200 of FIG. 2 corresponds to the communication described above in relation to FIG. 1. Note that the values of N and V in messages 211, 212, 213, 214, 215, 216, and 217 are illustrated as "N=1" and "V=64" for exemplary purposes only.

During operation, P108 sends a prepare request to a majority of the acceptors (e.g., the three nodes A110, A112, and A114). For example, P108 can send interest 211 to A112. Upon receiving interest 211, A112 can determine to agree with the prepare request by sending a responsive ACK content object 212. When P108 has received ACKs from the majority (collect sufficient ACKs function 230), P108 sends an accept request to the majority of the acceptors (e.g., A110, A112, and A114). For example, P108 can send interest 213 to A112. Upon receiving interest 213, A112 can determine to agree with the accept request by sending a responsive ACK content object 214. A112 (and each of majority of acceptors) can also send an interest or push notification 215 to L118.

L118 can respond to A112 with a responsive content object ACK or a push response (not shown). When L118 has received push notifications from the majority (collect sufficient ACKs 232), L118 can generate and transmit another interest (i.e., a learn request) to one or more targets. For example, L118 can send interest 216 to system 120. Upon receiving interest 216, system 120 can send a responsive ACK content object 217. Recall that L118 can also send a learn request to any proposer, acceptor, or other system (not shown).

Alternatively, instead of the acceptors notifying L118 directly and L118 performing function 232, P108 can collect sufficient ACKs from acceptors of the accept request (not shown) and P108 can subsequently send a learn request to L118 (not shown), which can then send interest 216 as depicted above.

Method for Facilitating Distributed Consensus in a CCN: Interest and Content Object Exchanges (Proposer; Acceptors; Learner)

Figure 3A:
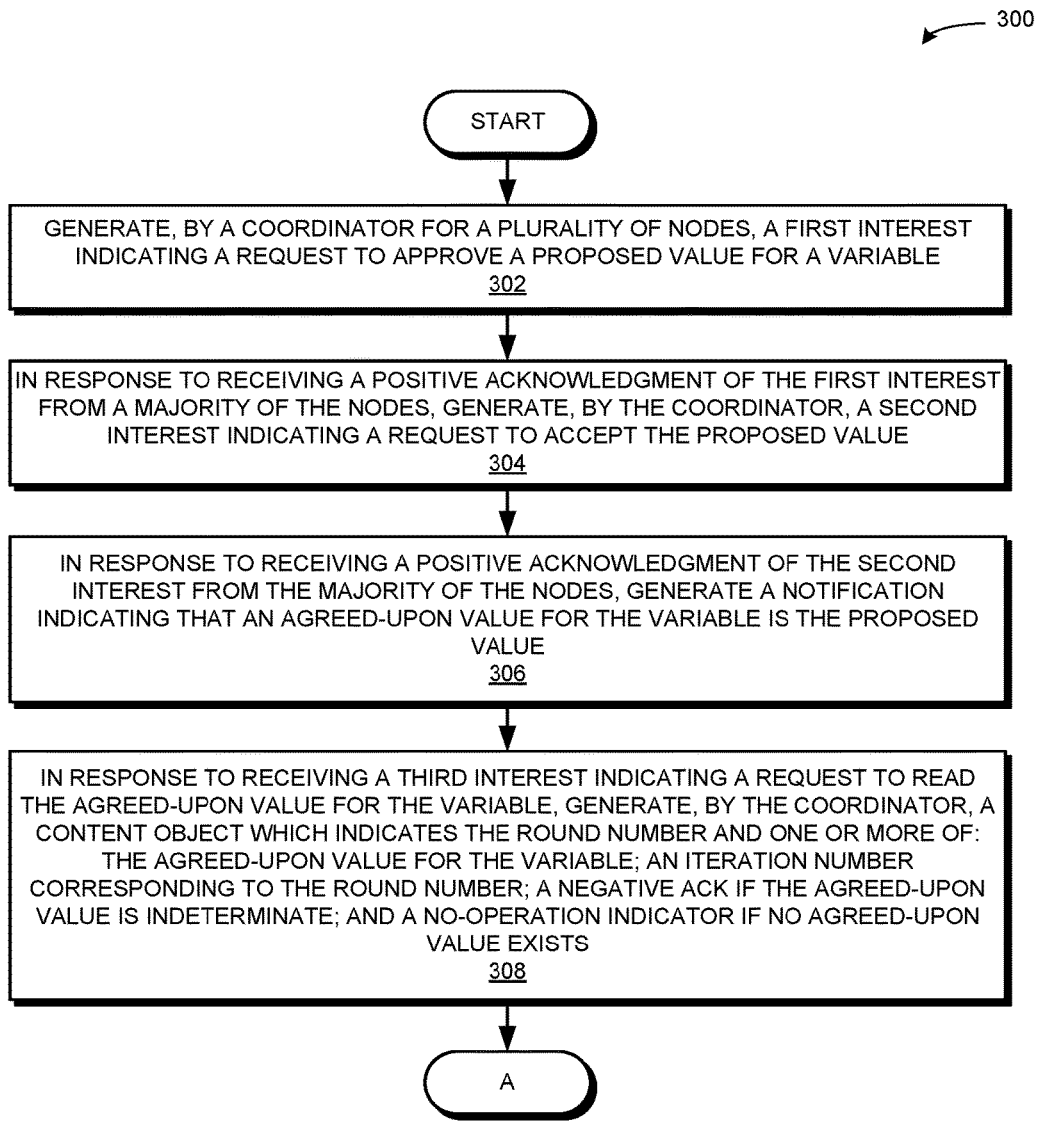
FIG. 3A presents a flow chart illustrating a method by a coordinator for facilitating distributed consensus in a content centric network, in accordance with an embodiment of the present invention.

FIG. 3A presents a flow chart 300 illustrating a method by a coordinator for facilitating distributed consensus in a content centric network, in accordance with an embodiment of the present invention. During operation, the system generates, by a coordinator for a plurality of nodes, a first interest indicating a request to approve a proposed value for a variable (operation 302). The coordinator can be a proposer. In response to receiving a positive acknowledgment of the first interest from a majority of the nodes, the coordinator generates a second interest indicating a request to accept the proposed value (operation 304). A name for the first interest and a name for the second interest include an identifier of the variable and a round number, and a payload of the first interest and a payload of the second interest include the proposed value. In response to receiving a positive acknowledgment of the second interest from the majority of the nodes, the system generates a notification indicating that an agreed-upon value for the variable is the proposed value (operation 306). In response to receiving a third interest indicating a request to read the agreed-upon value for the variable, the coordinator generates a content object which indicates the round number and one or more of:

the agreed-upon value for the variable; an iteration number corresponding to the round number; a negative ACK if the agreed-upon value is indeterminate; and a no-operation indicator if no agreed-upon value exists (operation 308). Note that operation 308 (i.e., a read request) can occur at any time, e.g., independent of and separate from operations 302-306. The operation continues at Label A of FIG. 3B.

Figure 3B:
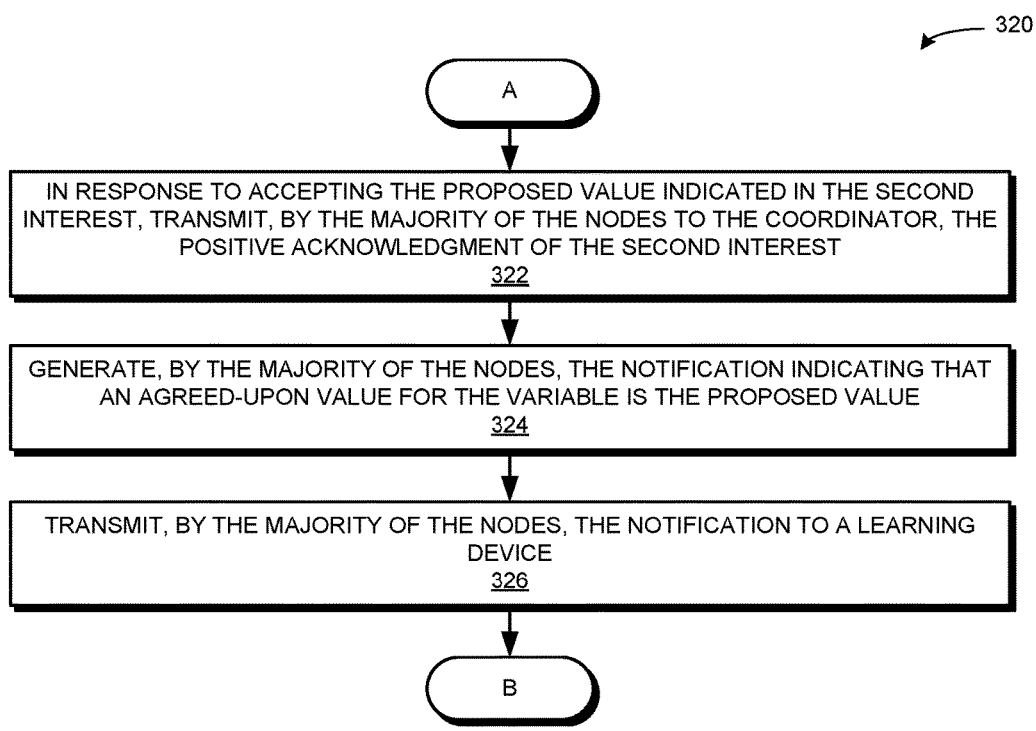
FIG. 3B presents a flow chart illustrating a method by acceptor nodes for facilitating distributed consensus in a content centric network, in accordance with an embodiment of the present invention.

FIG. 3B presents a flow chart 320 illustrating a method by acceptor nodes for facilitating distributed consensus in a content centric network, in accordance with an embodiment of the present invention. During operation, in response to accepting the proposed value indicated in the second interest, the majority of nodes transmits to the coordinator the positive acknowledgment of the second interest (operation 322). The majority of the nodes generates the notification indicating that an agreed-upon value for the variable is the proposed value (operation 324). The majority of the nodes transmits the notification to a learning device (operation 326). The operation continues at Label B of FIG. 3C.

Figure 3C:
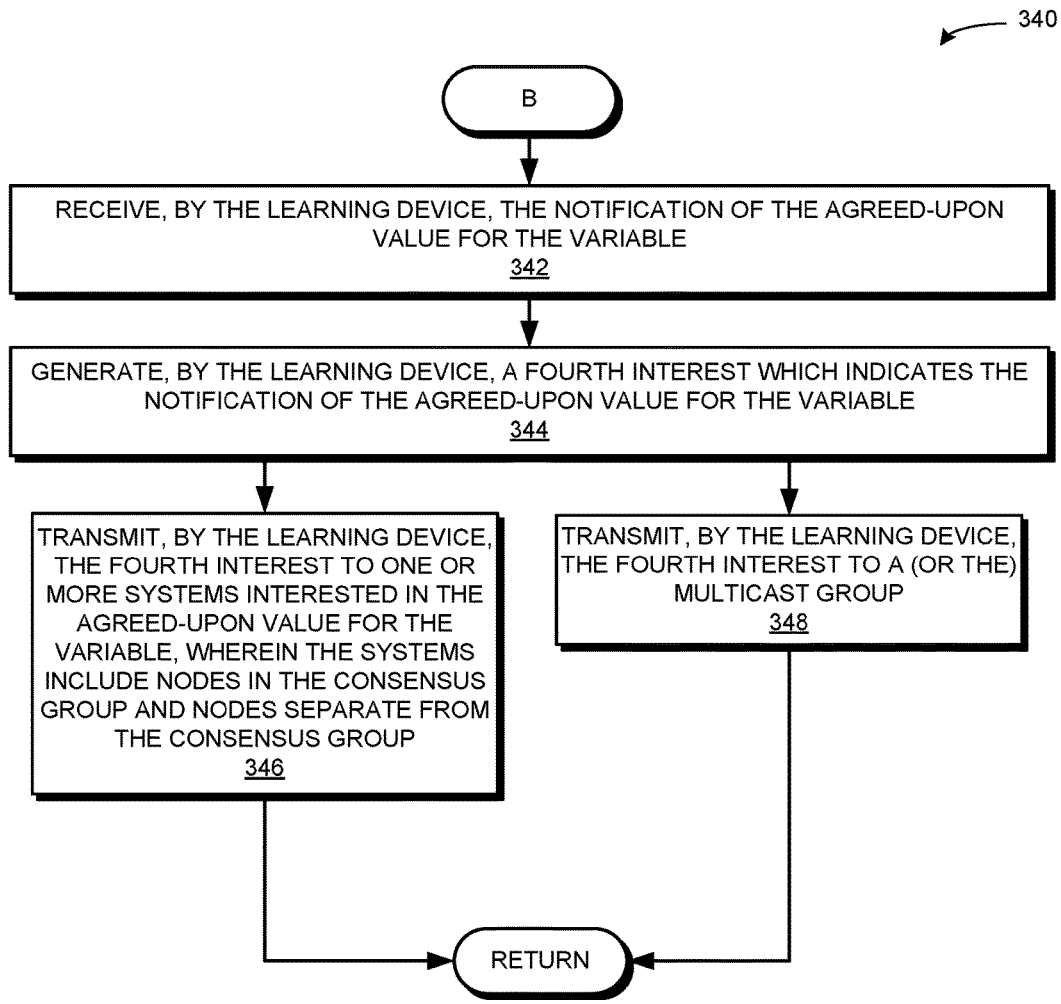
FIG. 3C presents a flow chart illustrating a method by a learning device for facilitating distributed consensus in a content centric network, in accordance with an embodiment of the present invention.

FIG. 3C presents a flow chart 340 illustrating a method by a learning device for facilitating distributed consensus in a content centric network, in accordance with an embodiment of the present invention. During operation, a learning device receives the notification of the agreed-upon value for the variable (operation 342). The notification can also include the round number and other information as described above in relation to Formats (1)-(4) and FIGS. 1 and 2. The learning device generates a fourth interest which indicates the notification of the agreed-upon value for the variable (operation 344). The learning device can transmit the fourth interest to one or more system interested in the agreed-upon value for the variable (operation 346). The interested systems can include nodes in the consensus group such as the proposer and the acceptors (whether in the majority of the acceptors or not). The interested systems can also include nodes or systems that are separate from and not related to the consensus group. A name for the fourth interest can include a name, identifier, or routable prefix for an interested system. The learning device can also transmit the fourth interest to a multicast group (operation 348) (or to "the" multicast group if Label B is reached from operation 410 of FIG. 4).

Method for Facilitating Distributed Consensus in a CCN: Interest Multicast

Figure 4:
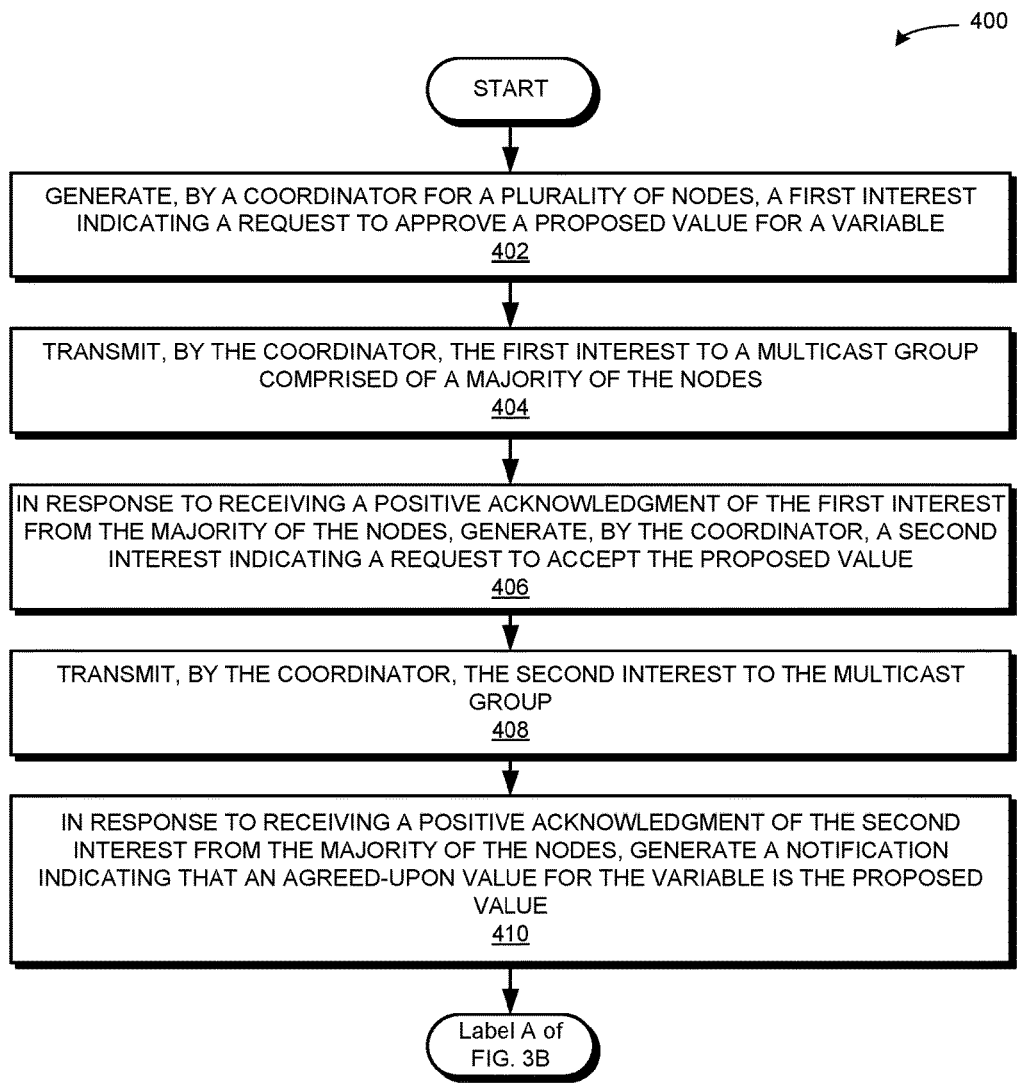
FIG. 4 presents a flow chart illustrating a method by a coordinator for facilitating distributed consensus in a content centric network, based on a multicast group, in accordance with an embodiment of the present invention.

FIG. 4 presents a flow chart 400 illustrating a method by a coordinator for facilitating distributed consensus in a content centric network, based on multicast group, in accordance with an embodiment of the present invention. During operation, the system generates, by a coordinator for a plurality of nodes, a first interest indicating a request to approve a proposed value for a variable (operation 402). The coordinator transmits the first interest to a multicast group comprised of a majority of the nodes (operation 404). In response to receiving a positive acknowledgment of the first interest from the majority of the nodes, the coordinator generates a second interest indicating a request to accept the proposed value (operation 406). A name for the first interest and a name for the second interest include an identifier of the variable and a round number, and a payload of the first interest and a payload of the second interest include the proposed value. The coordinator transmits the second interest to the multicast group (operation 408). In response to receiving a positive acknowledgment of the second interest from the majority of the nodes, the system generates a notification indicating that an agreed-upon value for the variable is the proposed value (operation 410). The operation continues at Label A of FIG. 3B.

Figure 5:
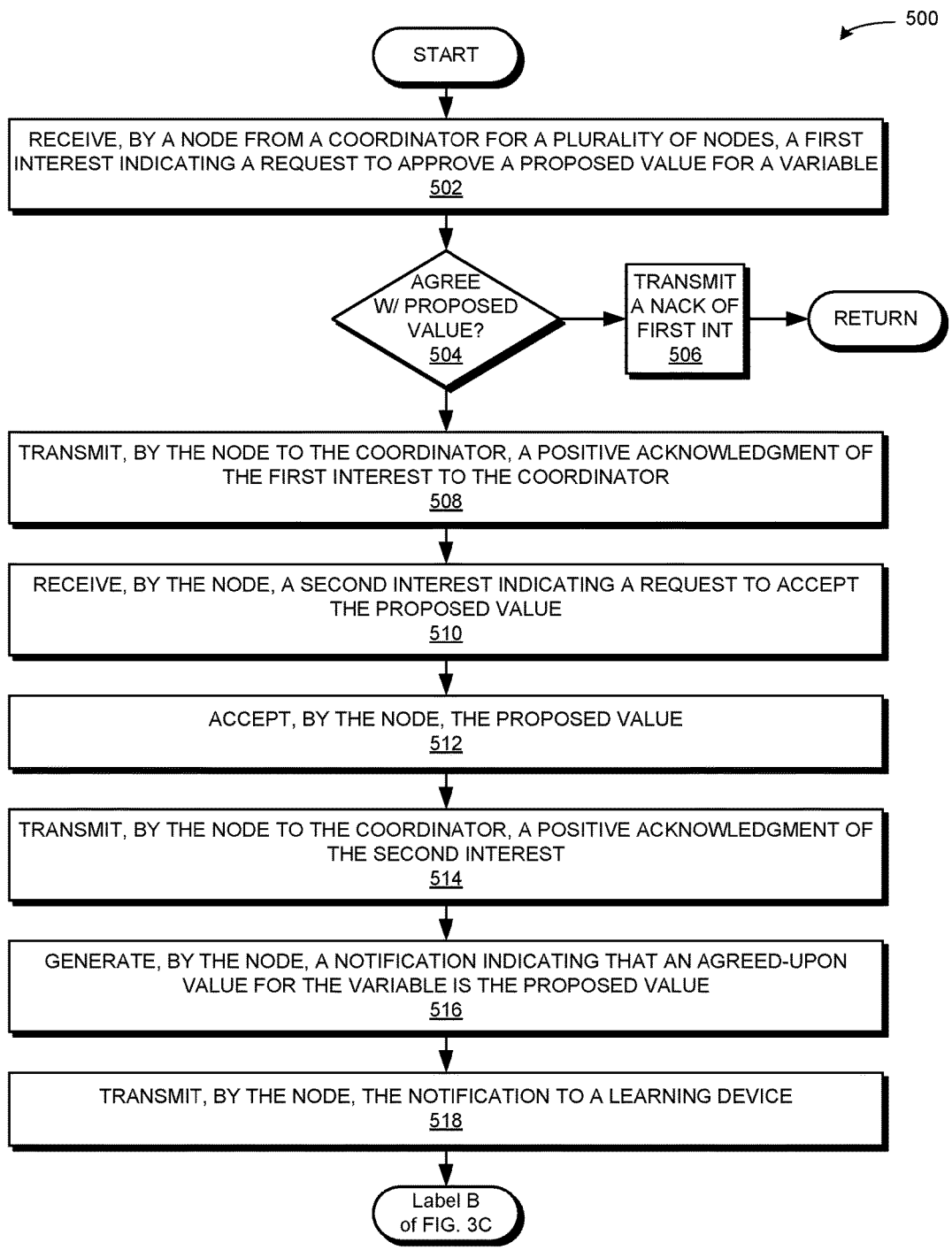
FIG. 5 presents a flow chart illustrating a method by an acceptor node for facilitating distributed consensus in a content centric network, in accordance with an embodiment of the present invention.

Role of Acceptor in Facilitating Distributed Consensus in a CCN: Interest and Content Object Exchanges FIG. 5 presents a flow chart 500 illustrating a method by an acceptor node for facilitating distributed consensus in a content centric network, in accordance with an embodiment of the present invention. During operation, the system receives, by a node from a coordinator for a plurality of nodes, a first interest indicating a request to approve a proposed value for a variable (operation 502). If the node does not agree with the proposed value (decision 504), the node transmits a negative acknowledgment of the first interest (operation 506) and the operation returns. The node can also include a previous value for the variable corresponding to a previous round number or iteration, along with the previous round number or iteration. Alternatively, the node can transmit nothing back to the coordinator, which can result in a timeout and is handled by the coordinator like a failure or a NACK.

If the node agrees with the proposed value (decision 504), the node transmits to the coordinator a positive acknowledgment of the first interest (operation 508). The node receives a second interest indicating a request to accept the proposed value (operation 510). The node will typically only receive the second interest in response to operation 508 (and not in response to operation 506). A name for the first interest and a name for the second interest include an identifier of the variable and a round number, and a payload of the first interest and a payload of the second interest include the proposed value.

The node accepts the proposed value (operation 512). The node can also determine to not accept the proposed value, and can send a negative acknowledgment to the coordinator (not shown). Upon accepting the proposed value, the node transmits to the coordinator a positive acknowledgment of the second interest (operation 514). The node generates a notification indicating that an agreed-upon value for the variable is the proposed value (operation 516), and the node transmits the notification to a learning device (operation 518). The operation continues at Label B of FIG. 3C.

Exemplary Computer System

Figure 6:
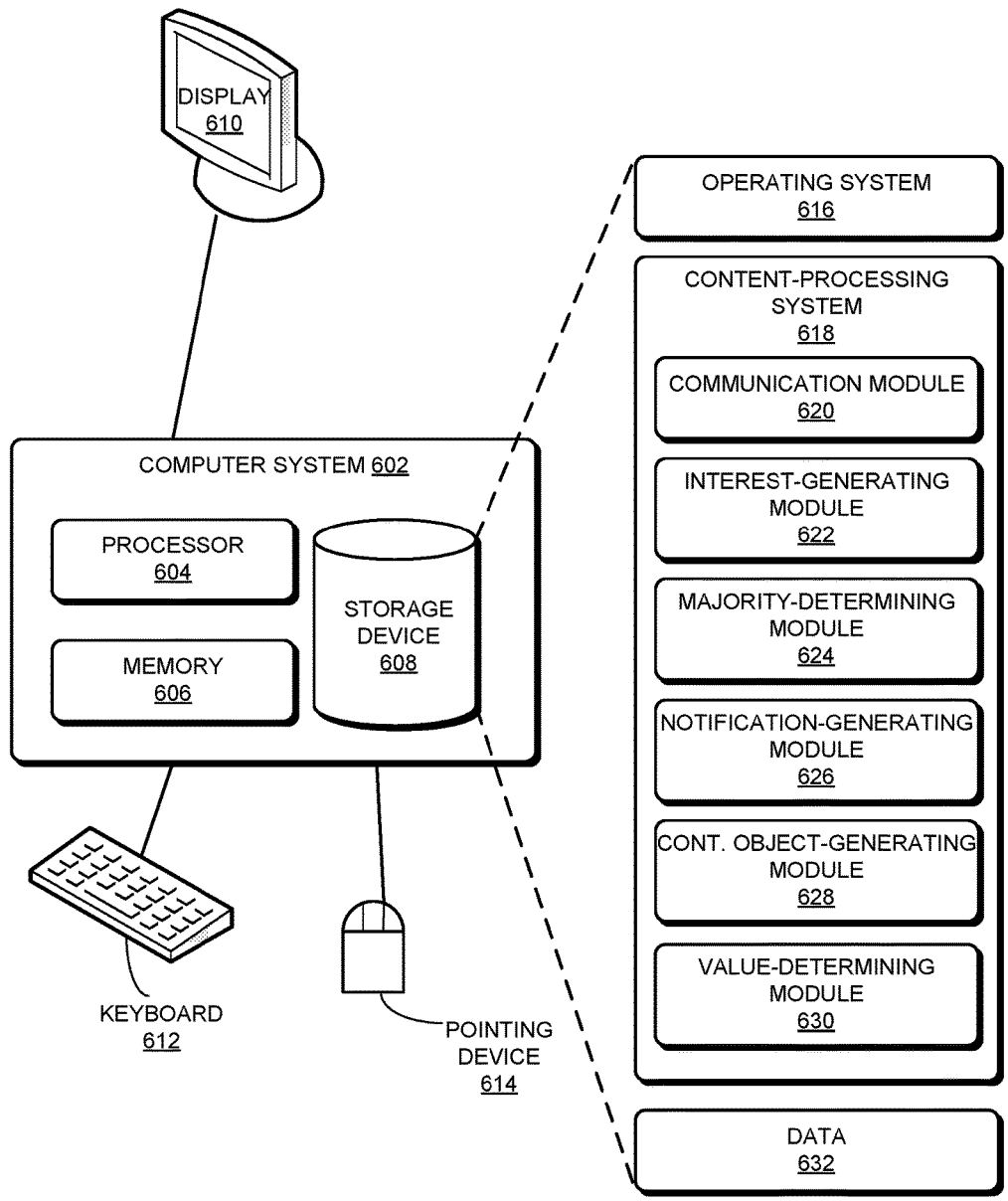
FIG. 6 illustrates an exemplary computer system that facilitates distributed consensus in a content centric network, in accordance with an embodiment of the present invention.

FIG. 6 illustrates an exemplary computer system that facilitates distributed consensus in a content centric network, in accordance with an embodiment of the present invention. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, a content-processing system 618, and data 630.

Content-processing system 618 can include instructions, which when executed by computer system 602, can cause computer system 602 to perform methods and/or processes described in this disclosure. Specifically, content-processing system 618 may include instructions for sending and/or receiving data packets to/from other network nodes across a computer network, such as a content centric network, where a data packet can correspond to an interest or a content object with a name and a payload, and can also correspond to a push interest, request, response, or notification message (communication module 620). Content-processing system 618 may include instructions for generating a first interest indicating a request to approve a proposed value for a variable (interest-generating module 622). Content-processing system 618 can include instructions for, in response to receiving a positive ACK of the first interest from a majority of the nodes (majority-determining module 624), generating a second interest indicating a request to accept the proposed value (interest-generating module 622). Content-processing system 618 can include instructions for, in response to receiving a positive ACK of the second interest from a majority of the nodes (majority-determining module 624), generating a notification indicating that an agreed-upon value for the variable is the proposed value (notification-generating module 626).

Content-processing system 618 can include instructions for, in response to receiving a third interest indicating a request to read the agreed-upon value for the variable (communication module 620), generating a content object which indicates the round number and one or more of: the agreed-upon value for the variable; an iteration number; a NACK; and a no-operation indicator (content object-generating module 628). Content-processing system 618 can include instructions for transmitting the first interest and the second interest to a multicast group (communication module 620).

Content-processing system 618 can further include instructions for receiving a first interest indicating a request to approve a proposed value for a variable (communication module 620). Content-processing system 618 can include instructions for, in response to agreeing with the proposed value (value-determining module 630), transmitting a positive ACK of the first interest to the coordinator (communication module 620; content object-generating module 628). Content-processing system 618 can include instructions for receiving a second interest indicating a request to accept the proposed value (communication module 620). Content-processing system 618 can include instructions for, in response to accepting the proposed value (value-determining module 630), transmitting a positive ACK of the second interest to the coordinator (communication module 620; content object-generating module 628), and transmitting a notification indicating that an agreed-upon value for the variable is the proposed value to a learning device (notification-generating module 626). Content-processing system 618 can include instructions for, in response to not agreeing with the proposed value (value-determining module 630), transmitting a negative ACK of the first interest to the coordinator (communication module 620).

Data 632 can include any data that is required as input or that is generated as output by the methods and/or processes described in this disclosure. Specifically, data 632 can store at least: a packet or message that is an interest, a content object, a push interest or request, a push response, or a notification; a value for a variable; a proposed value for the variable; an agreed-upon value for the variable; an identifier of the variable; a round number; a payload of an interest or a content object; a name for an interest or a content object; a name that is a hierarchically structured variable length identifier (HSVLI) comprised of contiguous name components ordered from a most general level to a most specific level; an indicator or identifier of a majority of nodes, a coordinator for a plurality of nodes, a node, an acceptor, or a learner; an iteration number corresponding to the round number; a negative acknowledgment if the agreed-upon value for the variable is indeterminate; a no-operation indicator if no agreed-upon value for the variable exists; a positive acknowledgment (ACK); a negative acknowledgment (NACK); a content object that includes a responsive ACK or NACK; a routable prefix for one of the majority of the nodes; an identifier for a consensus group to which the one of the majority of the nodes belongs, wherein the plurality of nodes belong to the consensus group; an indicator of a logical program associated with the variable identifier; a name that indicates a request to approve the proposed value for the variable, a request to accept the proposed value, a request to read the agreed-upon value, or a notification to allow a receiving device to learn the agreed-upon value; an indicator of a multicast group; an indicator of a group version to which the majority of the nodes belongs; a link to a piece of content which describes a current state of an algorithm; a link to a manifest, which is a content object indicating a collection of other content objects; the manifest embedded in the proposed value; and a content object with a lifetime set to a small or a zero value.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating distributed consensus in a content centric network, the computer system comprising:
    a processor; and
    a storage device storing instructions that when executed by the processor cause the processor to perform operations, the operations comprising:
        generating a first interest indicating a request to approve a proposed value for a variable, wherein the computer system is a coordinator for a plurality of nodes;
        in response to receiving a positive acknowledgment of the first interest from a majority of the nodes, generating a second interest indicating a request to accept the proposed value, wherein a name for the first interest and a name for the second interest include an identifier of the variable and a round number, and wherein a payload of the first interest and a payload of the second interest include the proposed value; and in response to receiving a positive acknowledgement of the second interest from the majority of the nodes, generating a notification indicating that an agreed-upon value for the variable is the proposed value.

2. The computer system of claim 1, wherein the operations further comprise:

in response to receiving a third interest indicating a request to read the agreed-upon value for the variable, wherein a name for the third interest includes the variable identifier and the round number, generating a content object which indicates the round number and one or more of:

the agreed-upon value for the variable;

an iteration number corresponding to the round number;

a negative acknowledgment if the agreed-upon value for the variable is indeterminate; and a no-operation indicator if no agreed-upon value for the variable exists.

3. The computer system of claim 2, wherein the positive acknowledgement of the second interest is transmitted to the coordinator by the majority of the nodes, wherein the notification is generated by the majority of the nodes and further transmitted to a learning device, which transmits the notification as a fourth interest to one or more systems interested in the agreed-upon value for the variable.

4. The computer system of claim 3, wherein the name for the first interest, the name for the second interest, the name for the third interest, and the name for the fourth interest further include one or more of:

a routable prefix for one of the majority of the nodes;

an identifier for a consensus group to which the one of the majority of the nodes belongs, wherein the plurality of nodes belong to the consensus group;

an indicator of a logical program associated with the variable identifier; and an iteration number corresponding to the round number.

5. The computer system of claim 3, wherein the name for the first interest indicates the request to approve the proposed value for the variable, wherein the name for the second interest indicates the request to accept the proposed value, wherein the name for the third interest indicates the request to read the agreed-upon value, and wherein the name for the fourth interest indicates the notification to allow a receiving device to learn the agreed-upon value.

6. The computer system of claim 1, wherein the operations further comprise:

transmitting, by the coordinator, the first interest to a multicast group comprised of the majority of the nodes; and transmitting, by the coordinator, the second interest to the multicast group, wherein the name for the first interest and the name for the second interest further include one or more of:

an identifier for a consensus group to which the one of the majority of the nodes belongs, wherein the plurality of nodes belong to the consensus group, wherein the consensus group identifier is the most general level name component; and an indicator of a group version to which the majority of the nodes belongs, wherein the payload of the first interest further includes a routable prefix of the coordinator to be used by a node in response to the first interest, and wherein the payload of the second interest further includes a routable prefix of a target to be used by a node in response to the second interest.

7. The computer system of claim 1, wherein the proposed value is one or more of:

a link to a piece of content which describes a current state of an algorithm;

a link to a manifest, which is a content object indicating a collection of other content objects; and the manifest embedded in the proposed value.

8. The computer system of claim 1, wherein a response by one of the majority of the nodes to an interest is a content object with a same name as the name for the interest, wherein the content object has a lifetime set to a small or a zero value.

9. A computer system for facilitating distributed consensus in a content centric network, the system comprising:

a processor; and a storage device storing instructions that when executed by the processor cause the processor to perform operations, the operations comprising:

receiving a first interest indicating a request to approve a proposed value for a variable, wherein the first interest is received from a coordinator for a plurality of nodes by a node;

in response to agreeing with the proposed value, transmitting a positive acknowledgement of the first interest to the coordinator;

receiving a second interest indicating a request to accept the proposed value, wherein a name for the first interest and a name for the second interest include an identifier of the variable and a round number, and wherein a payload of the first interest and a payload of the second interest include the proposed value; and in response to accepting the proposed value, transmitting a positive acknowledgement of the second interest to the coordinator.

10. The computer system of claim 9, wherein in response to accepting the proposed value, the operations further comprise:

transmitting a notification indicating that an agreed-upon value for the variable is the proposed value to a learning device, which transmits the notification as a third interest to one or more systems interested in the agreed-upon value for the variable.

11. The computer system of claim 9, wherein the operations further comprise:

in response to not agreeing with the proposed value, transmitting a negative acknowledgment of the first interest to the coordinator, wherein the negative acknowledgment includes a previous value for the variable corresponding to a previous round number.

12. The computer system of claim 10, wherein the name for the first interest, the name for the second interest, and the name for the third interest further include one or more of:

a routable prefix for one of a majority of the nodes;

an identifier for a consensus group to which the one of a majority of the nodes belongs, wherein the plurality of nodes belong to the consensus group;

an indicator of a logical program associated with the variable identifier; and an iteration number corresponding to the round number; and wherein the name for the first interest indicates the request to approve the proposed value for the variable, wherein the name for the second interest indicates the request to accept the proposed value, and wherein the name for the third interest indicates the notification to allow a receiving device to learn the agreed-upon value.

13. A computer-implemented method for facilitating distributed consensus in a content centric network, the method comprising:

generating a first interest indicating a request to approve a proposed value for a variable, wherein a computer system is a coordinator for a plurality of nodes;

in response to receiving a positive acknowledgment of the first interest from a majority of the nodes, generating a second interest indicating a request to accept the proposed value, wherein a name for the first interest and a name for the second interest include an identifier of the variable and a round number, and wherein a payload of the first interest and a payload of the second interest include the proposed value; and in response to receiving a positive acknowledgement of the second interest from the majority of the nodes, generating a notification indicating that an agreed-upon value for the variable is the proposed value.

14. The method of claim 13, further comprising:

in response to receiving a third interest indicating a request to read the agreed-upon value for the variable, wherein a name for the third interest includes the variable identifier and the round number, generating a content object which indicates the round number and one or more of:

the agreed-upon value for the variable;

an iteration number corresponding to the round number;

a negative acknowledgment if the agreed-upon value for the variable is indeterminate; and a no-operation indicator if no agreed-upon value for the variable exists.

15. The method of claim 14, wherein the positive acknowledgement of the second interest is transmitted to the coordinator by the majority of the nodes, wherein the notification is generated by the majority of the nodes and further transmitted to a learning device, which transmits the notification as a fourth interest to one or more systems interested in the agreed-upon value for the variable.

16. The method of claim 15, wherein the name for the first interest, the name for the second interest, the name for the third interest, and the name for the fourth interest further include one or more of:

a routable prefix for one of the majority of the nodes;

an identifier for a consensus group to which the one of the majority of the nodes belongs, wherein the plurality of nodes belong to the consensus group;

an indicator of a logical program associated with the variable identifier; and an iteration number corresponding to the round number.

17. The method of claim 16, wherein the name for the first interest indicates the request to approve the proposed value for the variable, wherein the name for the second interest indicates the request to accept the proposed value, wherein the name for the third interest indicates the request to read the agreed-upon value, and wherein the name for the fourth interest indicates the notification to allow a receiving device to learn the agreed-upon value.

18. The method of claim 13, further comprising:

transmitting, by the coordinator, the first interest to a multicast group comprised of the majority of the nodes; and transmitting, by the coordinator, the second interest to the multicast group, wherein the name for the first interest and the name for the second interest further include one or more of:

an identifier for a consensus group to which the one of the majority of the nodes belongs, wherein the plurality of nodes belong to the consensus group, wherein the consensus group identifier is the most general level name component; and an indicator of a group version to which the majority of the nodes belongs, wherein the payload of the first interest further includes a routable prefix of the coordinator to be used by a node in response to the first interest, and wherein the payload of the second interest further includes a routable prefix of a target to be used by a node in response to the second interest.

19. The method of claim 13, wherein the proposed value is one or more of:

a link to a piece of content which describes a current state of an algorithm;

a link to a manifest, which is a content object indicating a collection of other content objects; and the manifest embedded in the proposed value.

20. The method of claim 13, wherein a response by one of the majority of the nodes to an interest is a content object with a same name as the name for the interest, wherein the content object has a lifetime set to a small or a zero value.

* * * * *